United States Patent [19]

Nineuil

[11] Patent Number: 4,557,915
[45] Date of Patent: Dec. 10, 1985

[54] PRODUCTION OF PHOSPHORIC ACID

[75] Inventor: Guy Nineuil, Bihorel, France

[73] Assignee: Rhone-Poulenc Chimie de Base, Courbevoie, France

[21] Appl. No.: 627,672

[22] Filed: Jul. 5, 1984

[30] Foreign Application Priority Data

Jul. 5, 1983 [FR] France ............................... 83 11140

[51] Int. Cl.$^4$ ............................................. C01B 25/16
[52] U.S. Cl. .................................... 423/319; 423/167; 423/320
[58] Field of Search ................... 423/319, 320, 321 R, 423/321 S, 167

[56] References Cited

U.S. PATENT DOCUMENTS 2,636,806  4/1953  Winter ................................. 423/319
3,386,892  6/1968  Schmidt et al. ................. 423/321 R
3,498,746  3/1970  Smaltz et al. .................... 423/321 R

FOREIGN PATENT DOCUMENTS 87323    8/1983  European Pat. Off. ............ 423/321
1459008  8/1965  France .
1010107  11/1965 United Kingdom ............ 423/321 R
2094282  9/1982  United Kingdom .

OTHER PUBLICATIONS

Chemistry and Technology II, No. 3, pp. 313–316, 1968.

Nauka, M., pp. 39–42, 1966.

Primary Examiner—Gregory A. Heller
Attorney, Agent, or Firm—Burns, Doane, Swecker & Mathis

[57] ABSTRACT

Phosphoric acid is produced, with concomitant recovery of solids comprising compounds of fluorine and silica, by (i) acidulating a first amount of phosphate ore with a strong acid to produce a first phosphoric acid slurry, (ii) filtering said first slurry to separate the liquid phosphoric acid content therefrom, (iii) concentrating a fraction of the phosphoric acid thus separated, (iv) recovering same, and (v) condensing the evolved vapors of concentration with a liquid absorbent to produce a solution of fluosilicic acid, (vi) acidulating a second amount of phosphate ore with said solution of fluosilicic acid together with a fraction of said first slurry, or together with a fraction of the phosphoric acid separated in the step (ii), to produce a second phosphoric acid slurry, (vii) filtering said second slurry to separate both the liquid phosphoric acid content and a solids fraction therefrom, said solids fraction comprising fluorine and silica compounds, (viiia) recycling the phosphoric acid thus separated from said second slurry to the step (i), or (viiib) combining same with the fraction of separated phosphoric acid to be downstream concentrated in the step (iii).

20 Claims, 2 Drawing Figures

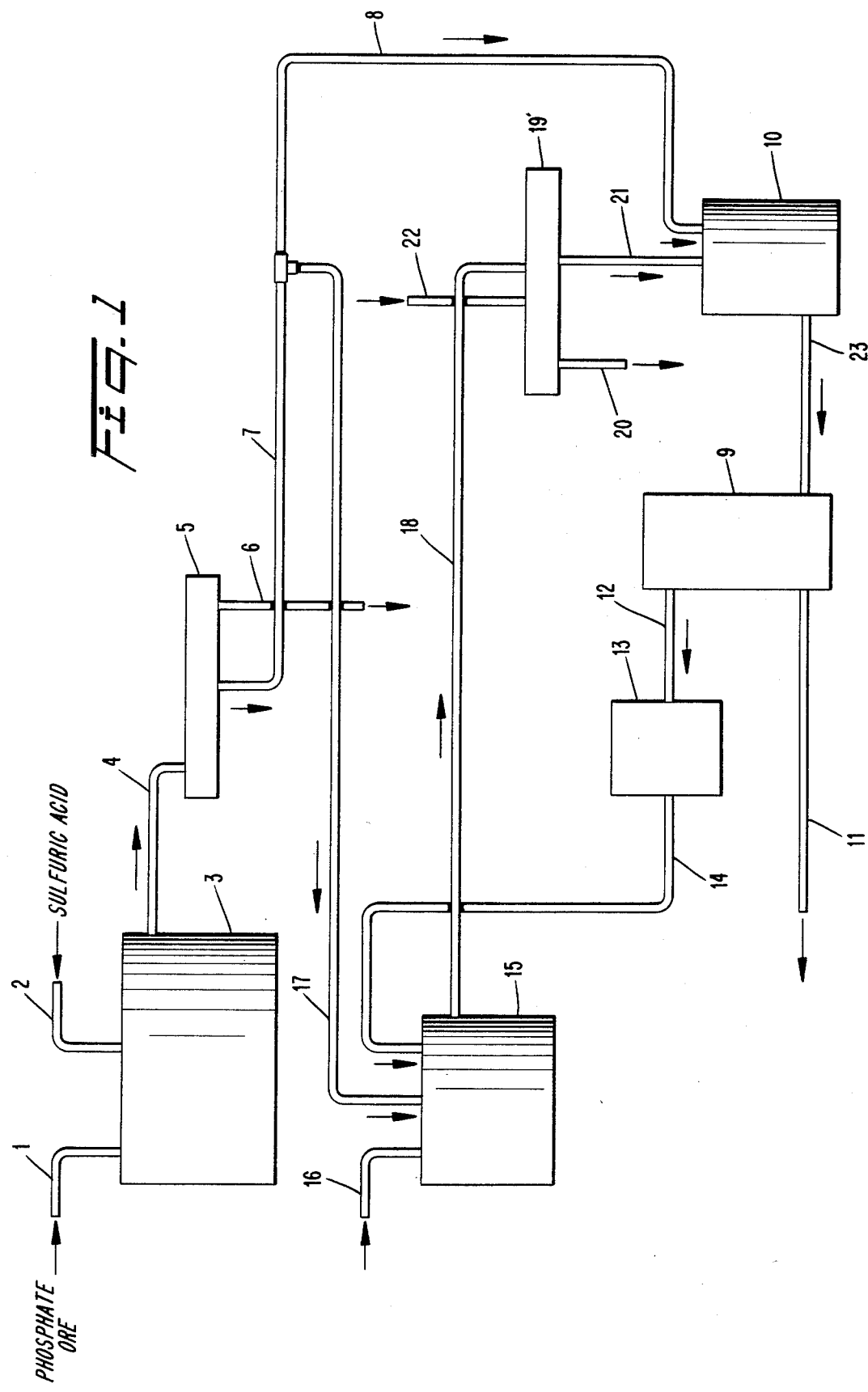

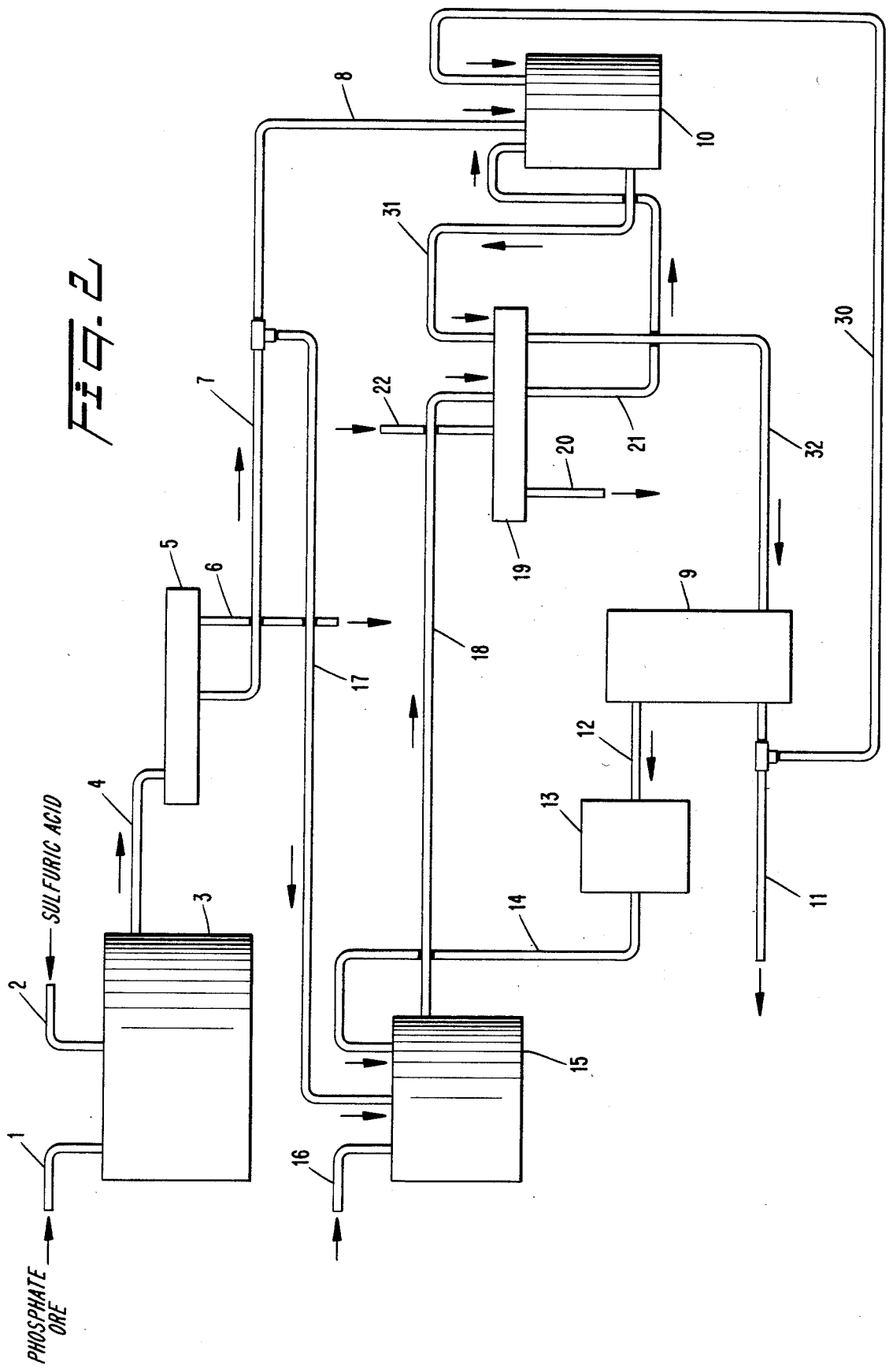

PRODUCTION OF PHOSPHORIC ACID

BACKGROUND OF THE INVENTION

1. Field of the Invention

The present invention relates to a process for the preparation of phosphoric acid with concomitant recovery of compounds of fluorine and silica in solid form.

2. Description of the Prior Art

When phosphoric acid is produced by wet process, as is well known to this art, after the acid attack on the phosphate ore and filtration, the result is a phosphoric acid which has a level of $P_2O_5$ concentration of from about 25 to 30%. Now, that acid is rarely used at such a level of concentration, in the various subsequent applications thereof.

Concentrations of from about 40 to 54% are generally required. Such, therefore, implies an acid concentration stage is required.

In the acid concentration operation, fluorides escape with the water vapor and, as it is not possible to discharge fluorine-charged vapors into the atmosphere, the vapors are treated with a liquid to absorb the fluorine compounds. That results in vapors from which fluorine has been removed and which can thus safely be discharged, and a solution of fluosilicic acid. The problem which arises, however, is that of finding use for the solution which also cannot be discharged, having regard to the fluorine content thereof.

SUMMARY OF THE INVENTION

Accordingly, a major object of the present invention is provision of technique for treating the aforementioned solution of fluosilicic acid and the recovery thereof in neutralized form.

Briefly, the process according to the invention features a first acid attack on a phosphate ore, thereby producing a first slurry, filtration of said slurry such as to separate the phosphoric acid produced, concentration of the acid with condensation of the vapors resulting from the concentration operation by contact with an absorbing liquid and recovery of a solution of fluosilicic acid, the process being characterized in that the phosphate ore or rock is acidulated with said solution of fluosilicic acid and in the presence of a first portion of the phosphoric acid produced after the filtration operation or a portion of said first slurry, thereby producing a second slurry, said second slurry is filtered, and solids are separated comprising compounds of fluorine and silica, essentially in the form of chukhrovite, and a phosphoric acid which, before concentration, is combined with the second portion of the acid produced after filtration of the first slurry or which is recycled to said first attack operation.

In another embodiment of the invention, a portion of the concentrated acid is mixed with the acids produced by filtration of said first and second slurries, the resulting mixture is filtered and the filtered acid produced is transferred to the concentration step.

The process of the invention is therefore particularly advantageous since it permits recycling of the solution of fluosilicic acid to the phosphoric acid production process and recovery, in neutralized form, of the compounds of fluorine and silica from the phosphoric acid.

In addition, as will later be seen, the subject process makes it possible to produce an acid which has a low proportion of impurities therein, in particular $H_2SO_4$.

Finally, the subject process enables use of a lesser amount of acid, for example, sulfuric acid, for the beginning acidulation of the ore.

BRIEF DESCRIPTION OF THE DRAWINGS

FIG. 1 is a schematic/diagrammatic illustration of one process/apparatus according to the invention; and FIG. 2 is a schematic/diagrammatic illustration of another process/apparatus according to the invention.

DETAILED DESCRIPTION OF THE INVENTION

More particularly according to this invention, the operation of acidulating the phosphate ore is carried out under known conditions, in a single tank or possibly in a plurality of tanks. The invention is especially adapted for an acid attack utilizing sulfuric acid and wherein the attack conditions result in the formation of gypsum.

The attack slurry is then filtered, and a phosphoric acid is produced, the level of concentration in respect of $P_2O_5$ therein generally being close to approximately 30%.

Therefore, that acid must then be concentrated. It will be appreciated that, before the concentration stage, it is possible to permit it to desupersaturate and settle under known conditions.

After the settling operation, the acid may be stored or directly transferred to the concentration operation.

In an alternative form of the invention and in the situation where the fluosilicic attack operation is carried out in the presence of phosphoric acid, the acid which is produced after the main attack operation and which has optionally been subjected to the treatments which have been described immediately above is divided into two portions before the concentration operation. The first portion is used for the fluosilicic attack operation which will be more fully described hereinafter, while the second portion is used for the concentration operation.

The concentration operation may be carried out by means of any known process. The concentration operation is generally carried out in such a manner as to produce an acid in which the $P_2O_5$ content usually ranges from 45 to 55%. It will be appreciated that the acid may be permitted to desupersaturate and then settle such as to produce a clarified acid which constitutes the production. In addition, in the concentration operation, vapors are then given off, which contain in particular fluorides, and those vapors are treated in an absorber to produce a solution of fluosilicic acid.

According to this invention, the fluosilicic acid solution is recycled to the system. For that purpose, the phosphate ore is subjected to attack with that solution and in the presence either of an attack slurry resulting from the main acid attack on the ore, as described hereinbefore, or phosphoric acid which is produced after the attack operation and after filtration and optionally after desupersaturation and settling. In the latter case, the phosphoric acid used for the attack operation may emanate from two origins. As described above, it may firstly be the strong filtration acid. There is another possibility. In fact, it is known that, at the moment of the filtration operation, besides the strong acid resulting from direct filtration of the slurry, weaker filtration acids or juices resulting from the step of washing the cake are also collected. Those juices are recycled to the attack operation. In accordance with this invention, it is possible to use a portion of such juices as a source of phosphoric acid for the fluosilicic attack operation.

The operation of attacking the ore by means of the fluosilicic acid is carried out under conditions such that the compounds of fluorine and silica are rendered essentially insoluble in the form of chukhrovite.

Generally, the fluosilicic acid solution used for the attack operation has a level of concentration of from about 10% to about 25% and preferably from 20 to 25%, in order to improve the water requirements and to achieve the maximum possible proportion of $P_2O_5$.

Moreover, the attack operation using fluosilicic acid must be carried out under conditions such that the liquid phase of the reaction mixture has a ratio $M^{n+}/PO_4^{3-}$ (wherein M denotes alkali metal and alkaline earth cations apart from $CaSO_4$), of about 0.1. That ratio may be slightly higher than 0.1. However, the upper limit for that ratio is fixed such as to avoid the formation of an emulsion in the reaction medium, which could prevent any subsequent separation of the phases, that emulsion being based on a mixture comprising calcium fluoride and phosphate salts.

The same ratio $M^{n+}/PO_4^{3-}$ is about 0.1 in the case of the usual phosphates and it varies slightly in inverse relation to the concentration in respect of $P_2O_5$. It may be lower than the value indicated above but in that case less fluorine is removed.

With the aforesaid ratio $M^{n+}/PO_4^{3-}$ being fixed, the operation is preferably carried out under conditions such that the amount of fluorine in the liquid phase expressed in the form $H_2SiF_6$ is about 2% or more and the $P_2O_5$ concentration is about 20 to 30%, preferably from 27 to 30%.

The foregoing conditions relating to the fluorine content are so determined as to cause precipitation of the maximum amount of fluorine.

The upper limit in regard to the aforesaid level of concentration is not a highly critical factor as, if the fluorine concentration is increased, the fluorine compounds are precipitated less and less and therefore the fluorine is recycled to the process and it is not removed. The aforenoted ranges therefore correspond to the optimum levels of concentration which permit maximum removal of the fluorine compounds.

The reaction temperature will preferably range from 60° C. to 80° C. The residence time in the attack tank will vary depending upon the desired rate of phosphate attack. Moreover, it is advantageous in the fluosilicic attack operation to add aluminum to the medium. Adding aluminum in that manner promotes the formation of chukhrovite. The aluminum may be added in any suitable form, in particular in the form of aluminum-rich phosphates.

The second slurry resulting from the attack operation is passed over a filter for separating the phosphoric acid produced and a solid comprising compounds of fluorine and silica, essentially in the form of chukhrovite.

The acid which is thus produced may be transferred to the first attack operation or mixed with the second portion of the acid produced after filtration of the first slurry. In the latter case, the mixture of acids is transferred to the concentration step.

Continuous embodiments of the invention will now be described with reference to the accompanying Figures of Drawing.

It will be noted that the following examples only describe fluosilicic attack in the presence of phosphoric acid, but not the situation where the attack operation would be carried out in the presence of a portion of slurry from the main attack operation. However, it will be apparent that all of the following description would likewise be applicable to the latter situation.

In accordance with the process/apparatus illustrated in FIG. 1, the phosphate ore and the sulfuric acid are introduced via inlets 1 and 2, respectively, into an attack vessel or tank 3. A slurry issues from the tank 3, at outlet 4, and is filtered on a filter 5. The gypsum formed is removed at 6. The filtered acid exits the filter at outlet 7.

After optional desupersaturation and settling, the phosphoric acid is divided into two fractions. One fraction is fed to the concentrator apparatus 9, via line 8, after passing through a tank 10.

A concentrated acid which constitutes the production issues from the concentrator apparatus 9, via line 11.

That acid may be subjected in manner known per se to a desupersaturation and/or settling operation which, after filtration, permit complementary removal of fluorine salts with the calcium sulfate formed. The vapors issuing from the apparatus 9 are transferred via line 12 into an absorber 13 from which a solution of fluosilicic acid is recovered at outlet 14.

That solution is then transferred into a second attack vessel or tank 15 where it is in the presence of phosphate ore introduced via inlet 16 and phosphoric acid supplied via the line 17, the flow 17 constituting the second fraction of the flow 7 issuing from the filter 5.

The second attack operation results in a second slurry which is fed via line 18 to a filter 19 for separating a solid which essentially comprises chukhrovite and sulfate of lime, withdrawn via line 20, and phosphoric acid, withdrawn via line 21, and transferred into the tank 10 for mixing with the acid introduced via line 8.

In addition, washing of the filter cake is effected via wash inlet 22.

FIG. 2 illustrates a second preferred embodiment of the invention which permits the process to be carried out more easily, as regards the removal of fluorine. This alternative form of the process of the invention essentially comprises remixing concentrated acid and the acids resulting from the main and fluosilicic attack operations to produce a mixture containing about 40% of $P_2O_5$, which permits additional amounts of fluorine to be precipitated. The same reference numberals are used to denote like pieces of apparatus and flowstreams of material, which are identical to those shown in FIG. 1. Therefore, the stages which are common to the two embodiments will not be described in detail.

Unlike the situation shown in FIG. 1, the acids lines 8 and 21 which are mixed in the tank 10 are not passed directly to the concentration step. They are first mixed in the tank 10 with a portion of the concentrated acid which is supplied via line 30. A precipitate of $CaSO_4$ and chukhrovite is then formed in the mixture.

The precipitate-charged acid mixture is transferred by means of line 31 over the filter 19. In the continuous filtration operation, it is subjected to a first filtering such as to form a first filter cake, and the slurry 18 is then filtered.

The mixture of acids resulting from filtration of the first cake or the first sector of the filter is then fed via line 32 to the concentrator apparatus 9.

It will be noted that it is possible not to mix at the same time the acids produced by filtration of the two slurries and the concentrated acid, but that it is possible to first effect a premixing of the acid of the first slurry and the acid of the second slurry. Moreover, the premix may be stored for a longer or shorter period of time, of from 1 hours to 24 hours, before being brought together with the concentrated acid. That manner of procedure makes it possible to produce crystals which are easier to filter.

In order to further illustrate the present invention and the advantages thereof, the following specific examples are given, it being understood that same are intended only as illustrative and in nowise limitative. In said examples to follow, all amounts are given in % by weight, unless otherwise indicated.

EXAMPLE 1

This example illustrates the embodiment of the invention shown in FIG. 1.

A fluosilicic attack operation was first carried out under the following conditions:

276 g/hour of a phosphate ore having the following composition were introduced into the attack vessel 15:

|      |           |       |
| ---- | --------- | ----- |
| (i)  | $P_2O_5$  | 36.7% |
| (ii) | F         | 3.8%  |
| (iii)| $SiO_2$   | 3.2%  |
| (iv) | $Al_2O_3$ | 1%    |

That ore was mixed with 1722 g/hour of phosphoric acid from line 17, resulting from a sulfuric acid attack operation, and having the following composition (the ratio by mass between the flowstreams 17 and 8 being $\frac{1}{4}$): $P_2O_5$: 27%; F: 1.9%; $SiO_2$: 1.1%; $H_2SO_4$: 2.58; $H_2SO_4/P_2O_5$: 9.53%; $Al_2O_3/P_2O_5$: 1.15, and was acidulated with 510 g/hour of a fluosilicic acid from line 14 having the following composition: F: 15.3%; $SiO_2$: 7.9%.

A slurry 18 was filtered, giving an acid having the following composition: $P_2O_5$: 26.85%; F: 4.02%; $SiO_2$: 2.20%; CaO: 4.25%; $Al_2O_3$: 0.1%. After washing, the result was a cake of 375 g, with a dry solid content at 120° C. of 36.7% and with 26.8% of F and 16.20% of $SiO_2$, with respect to the dry solid at 120° C.

After filtering and washing, the acid was mixed with phosphoric acid 8 of the same composition as the acid 17 in the tank 10, and the mixture was agitated for one hour. The mixture was concentrated in the apparatus 9, giving an acid 11 which, after desupersaturation in an agitated tank for 24 hours at 50° C. followed by filtration, had the following composition:

|        |                            |                         |
| ------ | -------------------------- | ----------------------- |
| (i)    | $P_2O_5$                   | 56.55%                  |
| (ii)   | $H_2SO_4$                  | 0.56%                   |
| (iii)  | F                          | 0.53%                   |
| (iv)   | $H_2SO_4/P_2O_5$           | 0.99                    |
| (v)    | Solid after filtering and washing | 130 g            |
| (vi)   | F                          | 1.54% solid as such     |
|        |                            | 3.1% dry solid at 60°   |
|        |                            | 3.7% dry solid at 120°  |
| (vii)  | $SiO_2$                    | 0.06%                   |
| (viii) | $Al_2O_3$                  | 0.6%                    |

EXAMPLE 2

The operation was carried out in the same manner as indicated in Example 1.

Attack vessel 15

300 g/h of a phosphate ore, 17 g of aluminum phosphate (containing 35% of $Al_2O_3$), 1722 g/h of a phosphoric acid and 510 g/h of a fluosilicic acid.

The ore and the acids were of the same composition as in Example 1. The ratios by mass of the flowstreams 17 and 8 were identical.

Filtered acid: $P_2O_5$: 26.8%; F: 3.58%; $SiO_2$: 2.14%; CaO: 4.8%; $Al_2O_3$: 0.3%. The product after washing was a cake weighing 345 g, with a dry solid content at 120° C. of 40.2% and with 27.39% of fluorine and 16.75% of $SiO_2$, with respect to the dry solid at 120° C.

The flowstreams 21 and 8 were mixed in the tank 10, under the same conditions as in Example 1.

The product was a phosphoric acid which, after concentration, had the following composition: $P_2O_5$: 52.35%; $SiO_2$: 0.15%; F: 0.61%.

After desupersaturation under the same conditions as in Example 1, followed by filtration, an acid was obtained having the following composition:

|       |                            |                         |
| ----- | -------------------------- | ----------------------- |
| (i)   | $P_2O_5$                   | 54%                     |
| (ii)  | $SiO_2/P_2O_5$             | 0.09%                   |
| (iii) | $H_2SO_4/P_2O_5$           | 0.24%                   |
| (iv)  | $F/P_2O_5$                 | 0.49%                   |
| (v)   | Solid after filtering and washing | 100 g            |
| (vi)  | F                          | 2.2% solid              |
|       |                            | 4.4% dry solid at 60° C. |
|       |                            | 5.3% dry solid at 120° C. |
| (vii) | $Al_2O_3$                  | 0.6%                    |

EXAMPLE 3

This example illustrates the embodiment of the invention shown in FIG. 2.

An attack operation 15 was carried out under the same conditions as in Example 1. The ratios by mass between the flowstreams 17 and 18 was $\frac{1}{4}$.

The flowstreams 21 and 8 were mixed and provided an acid having the following composition: $P_2O_5$: 27.0%; $SiO_2$: 1.25%; F: 2.31%; $Al_2O_3$: 0.3%.

That acid was mixed with an equivalent amount of a concentrated acid 30, 55.8% of $P_2O_5$, enriched with solids from the settled acid 11, 55.8% of $P_2O_5$.

That gave an acid 31 with a $P_2O_5$ concentration of 43%, which was filtered. Such provided a solid after washing of 80 g, with a F content of 4.84% with respect to the wet solid, that is to say, 12% with respect to the dry solid at 120° C. The acid 32 was concentrated. That gave the acid 11 which constituted the production and which, after settling, had the following composition:

$P_2O_5$: 55.8%; $SiO_2$: 0.10%; F: 0.3%; $H_2SO_4/P_2O_5$: 0.95%; $Al_2O_3$: 0.5%.

EXAMPLE 4

This Example also illustrates the embodiment of the invention shown in FIG. 2.

The attack operation 15 was carried out under the same conditions as in Example 2.

The ratios by mass of the flowstreams 17 and 8 were in a ratio of 3/7. The solid 20 had the same composition as given in Example 2.

The flowstreams 21 and 8, when mixed, gave an acid having the following composition:

$P_2O_5$: 29.64%; $SiO_2$: 0.58%; F: 2.06%; $Al_2O_3$: 0.4%.

That acid was mixed with an equivalent amount of an acid 30 at 54.7% enriched with the solid from the settled acid 11.

Such provided an acid 30 containing 42.75% of $P_2O_5$, which was filtered. The product was a solid after washing which weighed 90 g, containing 6.2% of fluorine, namely, 15% in regard to the dry solid at 120° C. The filtered acid 32 was concentrated. Resulting was the acid 11 which constituted the production and which, after settling, had the following composition:

$P_2O_5$: 54.7%; $SiO_2$: 0.04%; F: 0.27%; $H_2SO_4/P_2O_5$: 0.2%; $Al_2O_3$: 0.6%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the production of phosphoric acid, comprising (a) acidulating a first amount of phosphate ore with a strong acid to produce a first phosphoric acid slurry, (b) filtering said first slurry to separate the liquid phosphoric acid content therefrom, (c) concentrating a fraction of the phosphoric acid thus separated, (d) recovering same, and (e) condensing the evolved vapors of concentration with a liquid absorbent to produce a solution of fluosilicic acid, (f) acidulating a second amount of phosphate ore with said solution of fluosilicic acid together with a fraction of said first slurry, or together with a fraction of the phosphoric acid separated in the step (b), to produce a second phosphoric acid slurry, (g) filtering said second slurry to separate both the liquid phosphoric acid content and a solids fraction therefrom, said solids fraction comprising fluorine and silica compounds essentially in the form of chukhrovite, and (h) recycling the phosphoric acid thus separated from said second slurry to the step (i) and combining same with the fraction of separated phosphoric acid to be downstream concentrated in the step (a).

2. The process as defined by claim 1, wherein the step (a) acidulation is with sulfuric acid.

3. The process as defined by claim 1, wherein the step (f) acidulation is carried out such that the liquid phase of the reaction mixture has a ratio $M^{n+}/PO_4^{3-}$ of about 0.1, wherein M is an alkali metal or an alkaline earth metal cation other than $CaSO_4$.

4. The process as defined by claim 3, wherein the liquid phase of the reaction mixture has a content in fluorine, expressed as $H_2SiF_6$, of at least about 2%, and a content in respect of $P_2O_5$ ranging from about 20% to 30%.

5. The process as defined by claim 1, further comprising admixing a fraction of the concentrated phosphoric acid recovered in the step (d) with the acids separated in the filtration steps (b) and (g), filtering said combined acids to separate the liquid phosphoric acid content therefrom, and concentrating the phosphoric acid thus separated in the step (c).

6. The process as defined by claim 5, wherein the acids separated in the steps (b) and (g) are first admixed, and the resulting admixture is then combined with said concentrated phosphoric acid.

7. The process as defined by claim 5, the filtration step (g) and the filtering of the combined acids being through the same filter.

8. The process as defined in claim 1, comprising adding aluminum to the medium of acidulation in the step (f).

9. The process as defined by claim 1, comprising recovering chukhrovite from the step (g).

10. The process as defined by claim 1, comprising desupersaturating and settling concentrated phosphoric acid recovered in the step (d).

11. A process for the production of phosphoric acid, comprising (a) acidulating a first amount of phosphate ore with a strong acid to produce a first phosphoric acid slurry, (b) filtering said first slurry to separate the liquid phosphoric acid content therefrom, (c) concentrating a fraction of the phosphoric acid thus separated, (d) recovering same, and (e) condensing the evolved vapors of concentration with a liquid absorbent to produce a solution of fluosilicic acid, (f) acidulating a second amount of phosphate ore with said solution of fluosilicic acid together with a fraction of said first slurry, or together with a fraction of the phosphoric acid separated in the step (b), to produce a second phosphoric acid slurry, (g) filtering said second slurry to separate both the liquid phosphoric acid content and a solids fraction therefrom, said solids fraction comprising fluorine and silica compounds essentially in the form of chukhrovite, and (h) combining same with the fraction of separated phosphoric acid to be downstream concentrated in the step (a).

12. The process as defined by claim 11, wherein the step (a) acidulation is with sulfuric acid.

13. The process as defined by claim 11, wherein the step (f) acidulation is carried out such that the liquid phase of the reaction mixture has a ratio $M^{n+}/PO_4^{3-}$ of about 0.1, wherein M is an alkali metal or an alkaline earth metal cation other than $CaSO_4$.

14. The process as defined by claim 13, wherein the liquid phase of the reaction mixture has a content in fluorine, expressed as $H_2SiF_6$, of at least about 2%, and a content in respect of $P_2O_5$ ranging from about 20% to 30%.

15. The process as defined by claim 11, further comprising admixing a fraction of the concentrated phosphoric acid recovered in the step (d) with the acids separated in the filtration steps (b) and (g), filtering said combined acids to separate the liquid phosphoric acid content therefrom, and concentrating the phosphoric acid thus separated in the step (c).

16. The process as defined by claim 15, wherein the acids separated in the steps (b) and (g) are first admixed, and the resulting admixture is then combined with said concentrated phosphoric acid.

17. The process as defined by claim 15, the filtration step (g) and the filtering of the combined acid being through the same filter.

18. The process as defined by claim 11, comprising adding aluminum to the medium of acidulation in the step (f).

19. The process as defined by claim 11, comprising recovering chukhrovite from the step (g).

20. The process as defined by claim 11, comprising desupersaturating and settling concentrated phosphoric acid recovered in the step (d).

* * * * *

UNITED STATES PATENT AND TRADEMARK OFFICE
CERTIFICATE OF CORRECTION

PATENT NO. : 4,557,915

DATED : December 10, 1985

INVENTOR(S) : Guy NINEUIL

It is certified that error appears in the above-identified patent and that said Letters Patent is hereby corrected as shown below:

Claim 1, line 44, delete "step (i)" and kindly insert --step (a)--.

Claim 1, line 46, delete "step (a)" and kindly insert --step (c)--.

Signed and Sealed this

Twenty-sixth Day of August 1986

[SEAL]

Attest:

Attesting Officer

DONALD J. QUIGG

Commissioner of Patents and Trademarks

UNITED STATES PATENT AND TRADEMARK OFFICE
CERTIFICATE OF CORRECTION

PATENT NO. : 4,557,915

DATED : December 10, 1985

INVENTOR(S) : Guy NINEUIL

It is certified that error appears in the above-identified patent and that said Letters Patent is hereby corrected as shown below:

IN THE CLAIMS:

Claim 1, line 44, delete "(i) and combining".

Claim 1, line 45, delete the entire line.

Claim 1, line 46, delete "be downstream concentrated in the step".

Claim 11, line 33, delete "(a)" and insert "(c)".

This certificate supersedes Certificate of Correction issued August 26, 1986.

Signed and Sealed this

Eleventh Day of November, 1986

Attest:

DONALD J. QUIGG

*Attesting Officer*   *Commissioner of Patents and Trademarks*